Nov. 19, 1968  R. T. CORNELIUS ET AL  3,411,270

METHOD AND MEANS FOR DISPENSING COFFEE BEVERAGE

Filed Feb. 26, 1964  3 Sheets-Sheet 1

INVENTORS
RICHARD T. CORNELIUS
DONALD EDGAR HOLCOMB

ATTORNEYS

United States Patent Office 3,411,270
Patented Nov. 19, 1968

3,411,270
METHOD AND MEANS FOR DISPENSING COFFEE BEVERAGE
Richard T. Cornelius, Minneapolis, and Donald Edgar Holcomb, Brooklyn Center, Minn., assignors to The Cornelius Company, Anoka, Minn., a corporation of Minnesota
Filed Feb. 26, 1964, Ser. No. 347,473
12 Claims. (Cl. 55—42)

ABSTRACT OF THE DISCLOSURE

A decarbonator for carbonated coffee beverage includes an externally-heated thermally-conductive housing having internal baffles integral therewith which define a tortuous horizontal flow path having a dispensing faucet at the outlet end, and a valve which agitates incoming carbonated beverage at the other end, the valve being under the control of the liquid level in such flow path, carbon dioxide gas that is released by decarbonation being vented through a relief valve.

---

This invention relates to a method and means for handling or dispensing a preserved coffee beverage.

It has been learned that by suitably carbonating a prepared coffee beverage, its keeping qualities are greatly extended. However, carbonated coffee beverage is considered as being unpalatable, and therefore before consumption, such carbonated beverage must be decarbonated, and preferably heated. This invention therefore deals with a method and means for handling, treating, storing and dispensing such a preserved or carbonated coffee beverage, in which the coffee beverage is readied for imminent consumption by being decarbonated.

Accordingly, it is an object of the present invention to provide a method and means for dispensing coffee beverage.

Another object of the present invention is to provide a method and means for treating coffee beverage.

Yet another object of the present invention is to provide a method and means for decarbonating a carbonated coffee beverage.

A still further object of the present invention is to provide a method and means of the type described in which carbonated coffee beverage is caused to flow against a series of baffles to effect decarbonation thereof.

A still further object of the present invention is to provide a method and means of the type described in which the decarbonation effected by suitable baffles is augmented by one or more of reduction of velocity of flow, reduction of applied pressure, or increase of temperature.

Yet another object of the present invention is to provide a baffle construction that provides a generally or substantially horizontal flow of carbonated beverage for the decarbonation thereof.

Another object of the present invention is to provide coffee decarbonating structure wherein the decarbonation is augmented by a violent agitation of the beverage to be decarbonated.

Yet another object of the present invention is to provide a coffee decarbonating apparatus which may be employed with a burner.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

Figure 1:
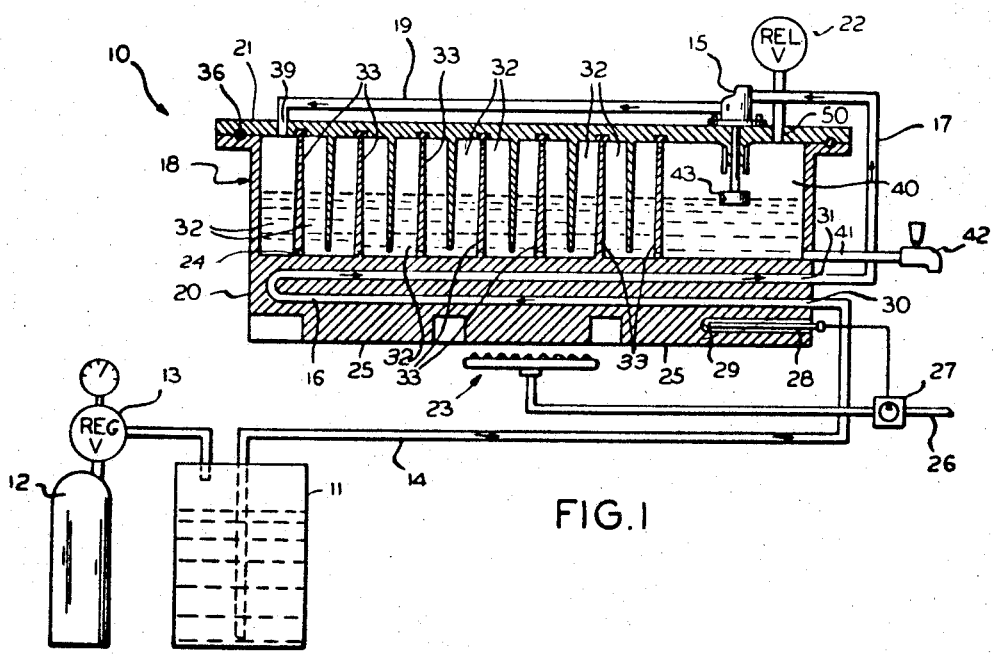
FIG. 1 is a diagrammatic view of a system for handling or treating and dispensing preserved coffee beverage, provided in accordance with the principles of the present invention.
Figure 2:
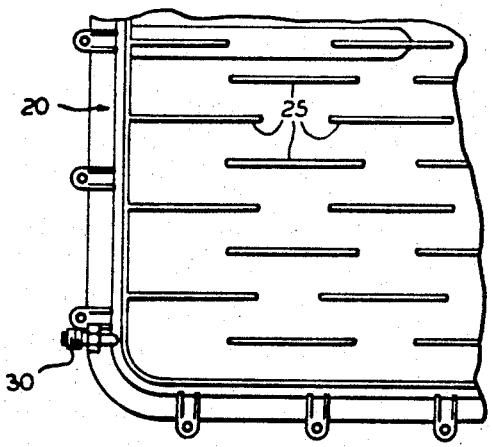
FIG. 2 is an enlarged fragmentary bottom view of a coffee beverage decarbonator, the same comprising an embodiment of the diagrammatic representation of FIG. 1.
Figure 3:
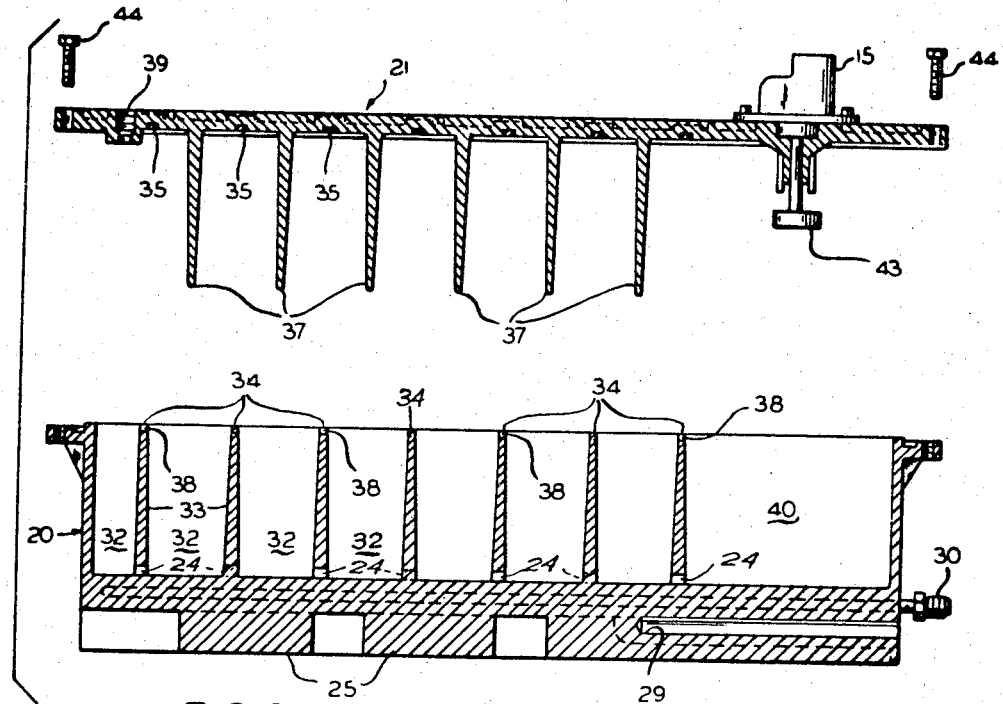
FIG. 3 is an enlarged cross-sectional view, shown in exploded form, of the decarbonator shown in FIG. 2.

The principles of the present invention are particularly useful when embodied in a preferred form of coffee dispensing apparatus such as illustrated in FIG. 1, generally indicated by the numeral 10. The system illustrated in FIG. 1 includes a supply of carbonated coffee beverage generally indicated at 11, which is under a constant pressure of carbon dioxide gas provided from a source 12 and controlled by a suitable pressure-regulating valve 13. The carbon dioxide gas in the container 11 above the liquid serves both as a propellant for the same, and also serves to aid in the preservation of the carbonated coffee beverage disposed therein.

To ready the carbonated coffee beverage for imminent consumption, the carbonated coffee beverage is conducted by a line 14, the flow through which is under the control of a float-actuated valve 15. In a preferred embodiments, the carbonated coffee beverage passes through a preheating coil 16 which is constructed to be of serpentine configuration, the pre-heating coil 16 being connected to the line 14 at one of its ends, and at the other end through a line 17 to the valve 15, and into a heatable decarbonator mechanism generally indicated at 18 by means of a line 19.

The pressure in the supply tank 11 preferably comprises the carbonation pressure employed in the processing of the freshly prepared coffee beverage. This pressure is reduced along the flow path of the coffee beverage, and the pressure in the decarbonator 18 is therefore maintained at a pressure which is somewhat less than that of the storage tank 11. Although this pressure is a reduced pressure, such pressure is slightly above atmospheric. To maintain such a pressure, there is provided a relief valve 22 which has a cracking pressure in the range between ½ and 5 p.s.i.

The decarbonator mechanism 18 includes a heater, here illustrated as being a gas burner 23 disposed below the decarbonator 18, which heater 23 is operative to direct heat directly against the decarbonator mechanism 18. In that the pre-heating coil 16 is embedded within the housing of the decarbonator 18, heat is thus preliminarily applied from the burner 23 to the quantity of coffee beverage being transferred before it reaches the valve 15.

When the pressure on the carbonated coffee beverage is reduced, as at the valve 15, and as later explained within the decarbonator 18, the carbonated beverage is rendered unstable. and carbon dioxide gas dissolved therein forms into bubbles which separate from the liquid, such carbon dioxide gas being collected and vented to the atmosphere by the relief valve 22. The coffee beverage flowing through the beverage pre-heating coil 16 not only has its temperature elevated to be ready for consumption, but also has its temperature elevated to render unstable the solution of carbon dioxide gas therein. The valve 15 not only permits a pressure drop, but also provides a mechanical agitation of the carbonated beverage, thereby further aiding in the rendering unstable of the carbonated coffee beverage which is to be decarbonated by the decarbonator 18.

Further heat is added to the decarbonator 18 and in particular to the carbonated beverage which has passed through the line 19 for maintaining its heat, for completing the decarbonation, and for thus maintaining the beverage at a temperature at which it is desired to serve the decarbonated coffee beverage.

The slight pressure of carbon dioxide gas which is retained and maintained by the relief valve 22 over the liquid coffee beverage in the decarbonator 18 serves to preserve the decarbonated coffee temporarily, such as for two days. Such pressure also serves as a propellant for speeding the rate at which coffee can be dispensed.

That portion of the system 10 to which the supply of coffee beverage 11 is attached may be enclosed within a suitably ornamented enclosure (not shown), the details of which do not form an essential part of this invention.

The decarbonator mechanism 18 includes a housing comprising a lower section 20 which is upwardly opening, and an upper or cover section 21 which closes the upwardly-opening lower section 20. Both of the sections 20 and 21 comprise thermally-conductive material, such as aluminum. The lower housing section 20 has a set of heat-absorbing fins 25 projecting outwardly therefrom in a downward direction. The burner 23 is connected to a suitable fuel supply line 26 and is under the control of an adjustably settable thermostatic valve 27 which has a sensing bulb or element 28 disposed in a well 29 in the lower housing section 20.

The pre-heating coil 16 has an inlet fitting 30 and an outlet fitting 31 respectively connected to the lines 14 and 17.

The upper portion of the lower housing section 18 is hollow and is divided into a number of compartments or chambers 32 by a successive series of horizontally-spaced vertical baffles 33. Each of the baffles 33 has an upper edge 34 which engages with a seal 35 in the cover 21. A suitable O-ring or gasket 36 is employed between the housing sections 20, 21 to provide a peripheral seal therebetween. The engagement between the housing sections is such that good heat transfer is provided from the one section to the other.

The cover section 21 has a series of baffle-like fins 37 depending into the spaces between the baffles 34 in a number of the chambers 32.

Each of the baffles 34 is integral with the lower housing section 20, and each of the baffle-like fins 37 is integral with the cover section 21. Because of this construction, each of the baffles 34 and fins 37 is in heat-transfer relation with the housing of the decarbonator 18. Heat can thus flow upwardly from the fins 25, upwardly through the bottom to each of the baffles 34, and thus into the metal which separates the chambers 32. Heat can also flow upwardly through the outer periphery of the lower housing section 20, to the cover 21, and thence downwardly in each of the baffle-like fins 37 into the central portion of each of the chambers 32 having such a fin 37. Heat thus also flows across the top of each of the chambers 32.

Figure 4:
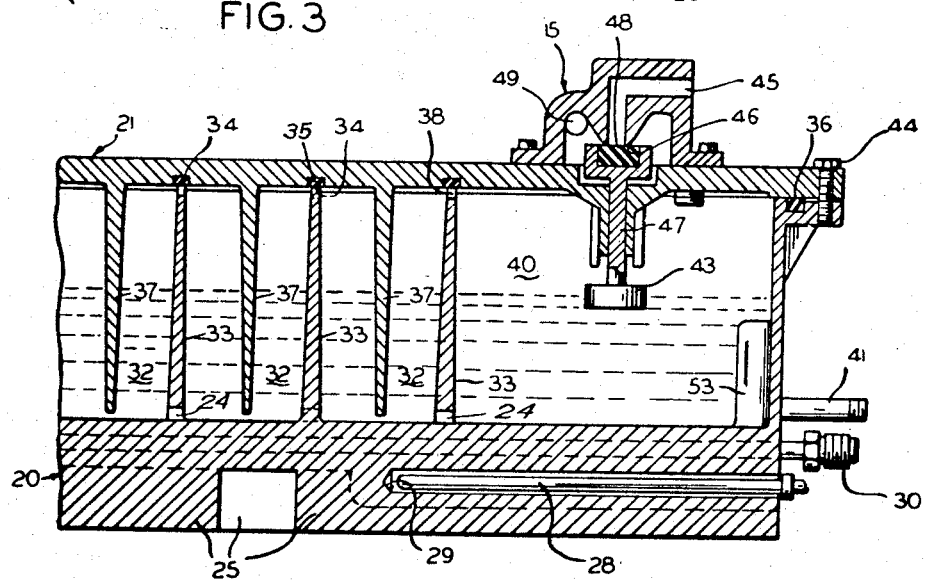
FIG. 4 is a further enlarged fragmentary cross-sectional view of the device shown in FIGS. 2 and 3, in assembled form.
Figure 6:
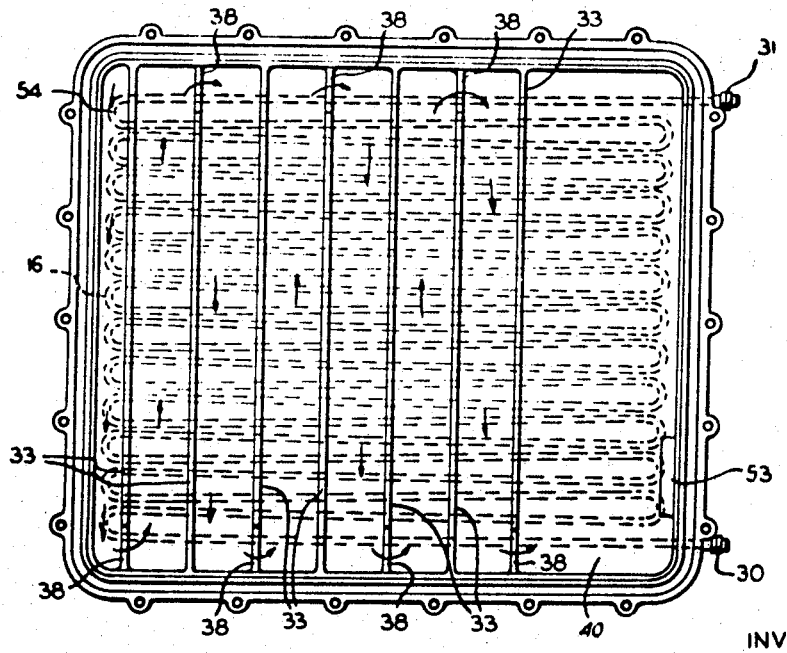
FIG. 6 is a top view in slightly reduced scale of the lower housing section or lower portion of FIG. 3.

The effectiveness of the seal or sealing provided by the various seals 35 and the upper edges 34 of the baffles 33 is interrupted in a staggered manner to provide a tortuous substantially horizontal flow path through the various chambers 32. To this end, a small portion of each seal 35 may be omitted or the upper edge 34 be notched at opposite ends of alternate baffles 33. Such notching is illustrated in this embodiment and is best seen in FIG. 6 where each notch is indicated by the numeral 38. Further, as best seen in FIG. 4, each of the baffles 33 has an elongated aperture or slot 24 located at the lower edge thereof in alignment with the notches 38. In this manner, the baffles 33 define a tortuous flow path which includes a series of successively communicating internal chambers into which flow path and chambers the baffle-like fins 37 project.

At its upstream end, the housing cover section 21 is provided with an inlet fitting 39 to which the line 19 is connected, and at its opposite or downstream end, the flow path leads to an endmost one of the chambers, designated at 40, which is also termed herein as a storage chamber. The storage chamber 40 has a connection 41 or outlet which communicates with a dispensing valve 42 by which means 41, 42 decarbonated coffee may be withdrawn from the chamber 40.

In this embodiment, the supply valve 15 is constructed to be responsive to the level of liquid in the chamber 40, and to this end, a suitable float or float actuator 43 is also disposed therein. The valve 15 provides a dynamic pressure drop between the supply 11 and the first chamber 32 when it is open, and provides a static pressure drop therebetween when the same is closed.

FIGS. 2–6 illustrate the structural details of the decarbonator 18 more specifically. Similar reference numerals have been employed. The housing sections 21 and 22 are received together with their peripheries aligned, and are so constructed that the baffle-like fins 37 are disposed substantially centrally within the various chambers 32. The length of each of the baffle-like members 37 is such that there is ample clearance at each of the ends thereof for liquid to flow thereabout. Once assembled, the housing sections 21 and 22 are held in fixed pressure-tight relation to each other by a number of screws 44.

The valve 15 is provided with an inlet 45 connected to the line 17 as shown in FIG. 1, and as shown in FIG. 4, the high pressure or inlet side of the valve 45 communicates with a valve seat 46. The float 43 actuates a stem and holder 47 which positions a soft valve element 48 against the seat 46. The downstream side of the seat 46 is connected by a port 49 to the line 19. The structural details for raising and lowering the valve element 48 in response to the liquid level are shown in FIG. 4 in a largely diagrammatic manner.

Figure 5:
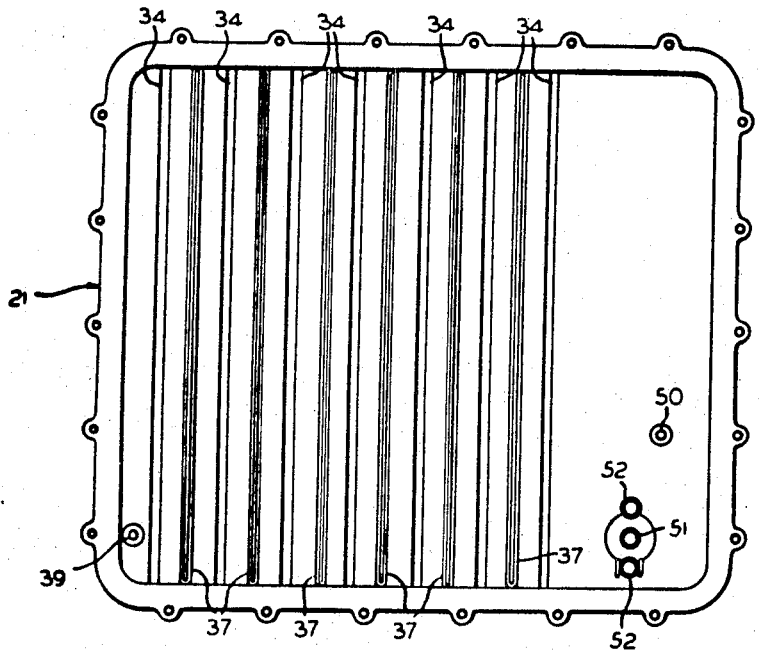
FIG. 5 is a bottom view in slightly reduced scale of the upper or cover section shown in FIG. 3, with a valve mechanism omitted.

Referring to FIG. 5, the cover section 21 is provided with a port 50 to which the relief valve 22 is connected, with a port 51 through which the valve 47 may extend, and with suitable bosses 52 for receiving screws which hold the valve 15 in place.

FIG. 6 best illustrates the serpentine arrangement in which the pre-heating coil 16 is disposed, beginning with the inlet 30 and ending at the outlet 31. A suitable boss 53 is provided so as to provide material for the support of a number of dispensing valve outlets 41. When the housing sections 20 and 21 are assembled, the inlet 39 for the beverage to be decarbonated is disposed substantially at the point indicated by the reference numeral 54, from which the substantially horizontal flow path follows the course indicated by the arrows in FIG. 6, such course being in the same direction along opposite sides of the baffle-like fin members.

The valve float 43 is not drawn to scale.

It is evident that the flow area through each of the chambers 32 is somewhat greater than the flow area at the inlet 39 or upstream therefrom.

The drawings illustrate the system 10 in a standby condition. As shown, carbon dioxide gas is acting on the preserved coffee beverage in the supply tank 11, and the pressure controlled by the regulator valve 13 is statically present in the line 14, the pre-heating coil 16, and the line 17, up to the valve 15. At the same time, the temperature control 27 in response to the temperature sensed by the bulb 28, causes operation of the burner 23 only to the extent necessary to maintain the desired temperature.

When a quantity of decarbonated coffee beverage is withdrawn at the dispensing valve 42, the liquid level in the chamber 40 is lowered, thereby opening the valve 15. Opening this valve enables transfer of the pre-heated coffee beverage disposed in the pre-heating coil 16, through such valve 15 and the line 19, and into the first of the chambers 32. Accompanying such movement, an additional quantity of carbonated coffee beverage is withdrawn from the supply tank 11 and received in the preheating coil 16. Upon restoration of the level in the storage chamber 40, the valve 15 is reclosed.

The heating of the carbonated beverage in the preheating coil 16 renders the carbonation thereof unstable. Moreover, the reduction of pressure which takes place in the valve 15 increases the instability of the carbonated beverage. Still further, as best seen in FIG. 4, the incoming carbonated beverage impinges against the valve element 48 creating a high amount of turbulence therein, such constituting a violent agitation. As the carbonated beverage leaves the outlet 49 and enters the line 19, it is not unusual for it to have a whipped cream consistency. However, such foam is of a temporary nature and breaks down of itself, the speed of such breakdown being increased or such breakdown being facilitated by such factors as the reduction in velocity of movement of such beverage as it passes through each of the compartments 32, the absorption of additional heat from the baffles 33 and the baffle-like fins 37, the frictional effect between the beverage and the baffles 33 and the baffle-like fin members 37, and the reduction of pressure.

As each tiny bubble breaks down, it becomes a quantity of liquid and a quantity of released carbon dioxide gas. The liquid collects in the bottom of each of the chambers 32, 40 until the float valve 15 is closed, liquid passing from one chamber to the next through the apertures 24. The released gas, being lighter, does not tend to stay in any chamber 32, but tends to flow at once horizontally along the surface of the liquid in the various chambers 32, and through the various undercuts or apertures 38 to the chamber 40 where venting of the same is controlled by the relief valve 22. In that the housing cover 21 is heated, it also acts on any foam which may be tending to move along with the released gas to break up the same, and to keep a clear path above the liquid in which the released carbon dioxide gas may flow. Under dispensing or dynamic conditions, a small pressure drop may be expected at each of the undercut portions 38, or from chamber to chamber.

The foregoing-described apparatus embodies various novel combinations of process steps by which decarbonated coffee is dispensed from a supply of coffee beverage, or more specifically from a pressurized supply thereof. To this end, the present invention includes the direction of a quantity of carbonated coffee against a successive series of baffles which, owing to their surface area, and the friction effect, act to release dissolved carbon dioxide gas. Such released or separated carbon dioxide gas is collected along the flow path and then vented. More specifically, the foregoing is accomplished employing pressurized carbonated coffee, and the carbonated coffee is directed along a substantially or generally horizontal tortuous flow path, separated carbon dioxide gas being collected along the entire length thereof for venting. The foregoing process steps are facilitated by the decrease of the velocity of flow of the carbonated coffee beverage while the same is caused to flow past the baffles, by decreasing the pressure on the pressurized carbonated beverage as the same flows past the baffles, and also by heating the carbonated coffee, as by means of heating the baffles, as it is directed past such baffles. It is also advantageous that as the carbonated coffee is progresively decarbonated along a successive series of chambers, that the pressure from chamber to chamber be slightly reduced so as to effect the decarbonation of the beverage progessively along the flow path.

Although various minor modifications might be suggested by those versed in the art, it should be understood that we wish to embody within the scope of the patent warranted hereon all such embodiments as reasonably and properly come within the scope of our contribution to the art.

We claim as our invention:
1. A process for degassing and dispensing coffee from a pressurized supply of carbonated coffee beverage, comprising:
   (a) directing a quantity of pressurized carbonated coffee beverage to flow from the supply against a series of baffles to a storage chamber where the same may be withdrawn;
   (b) degassing said coffee beverage by applying successively lower pressures to the quantity as it flows past the baffles, to thereby progressively render the carbonation of the quantity more unstable and to separate carbon dioxide gas;
   (c) collecting said separated carbon dioxide gas along the baffles, thereafter conducting said carbon dioxide gas with said quantity to the chamber, and venting it therefrom; and
   (d) dispensing a selected amount of such degassed coffee.

2. A process for degassing and dispensing coffee from a pressurized supply of carbonated coffee beverage, comprising:
   (a) directing a quantity of pressurized carbonated coffee beverage to flow from the supply against a series of baffles to a storage chamber where the same may be withdrawn;
   (b) degassing said coffee by applying heat to each of the baffles so as to elevate the temperature of the quantity as it flows past the baffles to render the carbonation thereof more unstable and to separate carbon dioxide gas therefrom;
   (c) collecting said separated carbon dioxide gas along the baffles, conducting said carbon dioxide gas to the chamber, and venting said carbon dioxide gas therefrom; and
   (d) dispensing a selected amount of such degassed coffee.

3. Apparatus for dispensing coffee from a supply of carbonated coffee beverage, comprising:
   (a) a housing having means defining an internal flow path adapted at one end to be connected to the supply of carbonated coffee beverage, said flow path terminating at the opposite end in a storage chamber from which decarbonated coffee may be withdrawn, said flow path means including a successive series of baffles so arranged that said flow path includes only
      (1) an upper zigzag portion extending only above certain baffles for conducting separated gas to said chamber, and
      (2) a lower zigzag portion extending only below said certain baffles for conducting beverage to said chamber, said baffles being otherwise imperforate;
   (b) means for venting separated carbon dioxide gas only from said storage chamber; and
   (c) means for dispensing a selected amount of such decarbonated coffee from said storage chamber.

4. Apparatus for dispensing coffee from a pressurized supply of carbonated coffee beverage, comprising:
   (a) a housing having means defining an elongated fluid flow path terminating at its downstream end in a storage chamber from which decarbonated coffee may be withdrawn;
   (b) a valve connected to the upstream end of said flow path means, and adapted to be connected to the pressurized supply of carbonated coffee beverage;
   (c) said flow path means intermediate said ends including means for degassing the carbonated coffee;
   (d) means responsive to the liquid level in said storage chamber for controlling the operation of said valve, said valve being operative to reduce the pressure applied to the carbonated coffee beverage while in said elongated flow path; and (e) means for venting separated carbon dioxide gas only from said storage chamber.

5. Apparatus for dispensing carbonated coffee from a pressurized supply of carbonated coffee beverage, comprising:
   (a) a heater;
   (b) a thermally-conductive housing having an exterior portion which is disposed in heat-transfer relation to said heater, said housing having internal means defining an internal flow path remote from said heater and adapted at one end to be connected to the supply of carbonated coffee beverage, said flow path means intermediate its ends including a successive series of thermally-conductive baffles supported in heat-transfer relation to the interior of said housing, and said flow path terminating at the opposite end in a storage chamber from which decarbonated coffee may be withdrawn;
   (c) a valve connected to the upstream end of said flow path means, and adapted to be connected to the pressurized supply of carbonated coffee beverage;
   (d) means responsive to the liquid level in said storage chamber for controlling the operation of said valve, said valve being operative to reduce the pressure applied to the carbonated coffee beverage at said baffles; and
   (e) means for venting separated carbon dioxide gas from said storage chamber.

6. Apparatus for dispensing coffee from a supply of carbonated coffee beverage, comprising:
   (a) a housing having
      (1) an upwardly-opening lower section, said lower section having a series of horizontally-spaced vertical baffles integral therewith, and defining a generally horizontal internal flow path, and
      (2) a cover section removably secured to and closing said lower section, said cover section having baffle-like fins integral with said cover section and depending therefrom into said flow path means between said baffles and spaced at all points from said lower section,
   said housing being adapted at one end of said flow path to be connected to the supply of carbonated coffee beverage, and said housing having means at the other end of said flow path from which decarbonated coffee may be withdrawn; and
   (b) means for venting separated carbon dioxide gas from said housing.

7. Apparatus for dispensing coffee from a supply of carbonated coffee beverage, comprising:
   (a) a heater;
   (b) a housing having
      (1) a thermally-conductive upwardly-opening lower section having an exterior portion which is disposed in heat-transfer relation to said heater, said lower section having a series of horizontally-spaced thermally-conductive baffles secured in heat-transfer relation to the interior of said lower section, and defining a generally horizontal internal flow path remote from said heater, and
      (2) a separate thermally-conductive cover section both removably secured in heat-transfer relation to and having a pressure seal with said lower section, said cover section having a separate series of thermally-conductive baffle-like fins secured in heat-transfer relation to the interior thereof and extending into said flow path between said baffles and spaced at all points from said lower section,
   said housing being adapted at one end of said flow path to be connected to the supply of carbonated coffee beverage, and said housing having means at the other end of said flow path from which decarbonated coffee may be withdrawn; and
   (c) means for venting separated carbon dioxide gas from said housing.

8. Apparatus for dispensing coffee from a supply of carbonated coffee beverage, comprising:
   (a) a heater;
   (b) a housing having
      (1) a thermally-conductive upwardly-opening lower section having an external series of thermally-conductive fins integral therewith and projecting downwardly therefrom in heat-transfer relation therewith and with said heater, said lower section having a series of horizontally-spaced thermally-conductive baffles integral with the interior of said lower section and projecting upwardly, and defining a generally horizontal internal flow path remote from said heater, and
      (2) a cover section removably secured to and closing said lower section, and having baffle-like fins projecting between said baffles and spaced at all points from said lower section,
   said housing being adapted at one end of said flow path to be connected to the supply of carbonated coffee beverage, and said housing having means at the other end of said flow path from which decarbonated coffee may be withdrawn; and
   (c) means for venting separated carbon dioxide gas from said housing.

9. Apparatus for dispensing coffee from a pressurized supply of carbonated coffee beverage, comprising:
   (a) a housing having
      (1) an upwardly-opening lower section, said lower section having a series of internal baffles each of which has an upwardly directed upper edge, and
      (2) a cover section closing said lower section and removably secured thereto in fluid-tight relation,
   said housing sections having a further seal therebetween along said upper edge of each of said baffles, thereby with said baffles defining a series of internal chambers, the effectiveness of said further seals being interrupted in a staggered manner to provide a tortuous flow path through said chambers, said housing being adapted at one end of said flow path to be connected to the supply of carbonated coffee beverage, and said housing having means at the other end of said flow path from which decarbonated coffee may be withdrawn; and
   (b) means for venting separated carbon dioxide gas from said housing.

10. Apparatus for dispensing coffee from a pressurized supply of carbonated coffee beverage, comprising:
   (a) a housing having
      (1) an upwardly-opening thermally-conductive lower section having a series of horizontally-spaced vertical internal baffles integral therewith, each of which has an upwardly directed upper edge, said lower section having a series of external fins projecting downwardly therefrom and being integral therewith, and
      (2) a thermally-conductive cover section having a series of horizontally-spaced vertical baffle-like fins integral therewith, said cover section being removably secured to said lower section in fluid-tight heat-transfer relation therewith, said fins depending therefrom and extending between said baffles,
   said housing sections having a further seal therebetween along said upper edge of each of said baffles, thereby with said baffles defining a series of internal chambers, the effectiveness of said further seals being interrupted in a staggered manner to provide a horizontally tortuous flow path through said chambers, said housing having means at one end of said flow path for being connected to the supply of carbonated coffee beverage, and said housing having outlet means at the other end of said flow path from which decarbonated coffee may be withdrawn;

(b) a burner disposed to direct heat against said external fins for effecting heating of the carbonated coffee beverage to render it unstable; and (c) means for venting separated carbon dioxide gas from said housing.

11. Apparatus for dispensing coffee from a pressurized supply of carbonated coffee beverage, comprising:

(a) a housing having
  (1) an upwardly-opening thermally-conductive lower section having a series of horizontally-spaced vertical internal baffles integral therewith, each of which has an upwardly directed upper edge, and
  (2) a thermally-conductive cover section having a series of horizontally-spaced vertical baffle-like fins integral therewith, said cover section being removably secured to said lower section in fluid-tight heat-transfer relation therewith, said fins depending therefrom and extending between said baffles,
  said housing sections having a further seal therebetween along said upper edge of each of said baffles, thereby with said baffles defining a series of internal chambers, the effectiveness of said further seals being interrupted in a staggered manner to provide a horizontally tortuous flow path through said chambers, said housing having means at one end of said flow path for being connected to the supply of carbonated coffee beverage, and said housing having outlet means at the other end of said flow path from which decarbonated coffee may be withdrawn;

(b) a heater disposed in heat-transfer relation to said housing; and (c) means for venting separated carbon dioxide gas from said housing.

12. Apparatus for dispensing coffee from a supply of carbonated coffee beverage, comprising:

(a) a thermally conductive housing having a preheating coil embedded in a lower portion thereof, said coil having an inlet for being connected to the beverage supply for receiving a quantity of the carbonated beverage, said coil having an outlet;

(b) means with said housing defining a coffee beverage storage chamber in heat-transfer relation to said lower portion, said chamber being connected to said coil outlet and having means by which heated beverage may be withdrawn therefrom;

(c) a series of thermally conductive fins projecting downwardly from said lower portion of said housing and secured exteriorly thereto in heat-transfer relation;

(d) a burner diposed to direct heat against said fins to raise the temperature of said coffee beverage in said coil for imminent consumption and to render its carbonation unstable, and to drive the carbon dioxide gas out of the carbonated coffee beverage in said chamber; and (e) means for venting separated carbon dioxide gas from said housing.

References Cited
UNITED STATES PATENTS

| | | | |
|---|---|---|---|
| 2,686,863 | 8/1954 | Chandler | 219—297 |
| 2,730,190 | 1/1956 | Brown et al. | 55—45 |
| 2,779,855 | 1/1957 | Sawyer | 219—297 |
| 2,926,754 | 3/1960 | Ragatz | 55—38 |
| 3,068,812 | 12/1962 | Hemeon | 55—69 |
| 3,261,507 | 7/1966 | Cornelius | 222—146 |
| 3,078,648 | 2/1963 | Edmondson | 55—202 |
| 3,331,188 | 7/1967 | Sinex | 55—174 |

REUBEN FRIEDMAN, *Primary Examiner.*

C. N. HART, *Assistant Examiner.*